United States Patent [19]

Michel

[11] 4,422,992
[45] Dec. 27, 1983

[54] EXTRUDER PROCESS FOR PREPARATION OF CARBON FIBER REINFORCED FLUOROPOLYMER COMPOSITIONS

[75] Inventor: Rudolph H. Michel, Wilmington, Del.

[73] Assignee: E. I, Du Pont de Nemours & Company, Wilmington, Del.

[21] Appl. No.: 348,365

[22] Filed: Feb. 12, 1982

[51] Int. Cl.$^3$ .............................................. B29B 1/10
[52] U.S. Cl. ................................ 264/108; 264/127; 264/171; 264/176 R; 264/349; 425/204; 425/376 R; 425/DIG. 55; 523/215
[58] Field of Search ............... 264/171, 108, 349, 127, 264/176 R; 425/204, 376 R, DIG. 55; 523/215

[56] References Cited

U.S. PATENT DOCUMENTS

| | | | |
|---|---|---|---|
| 3,164,563 | 1/1965 | Maxwell et al. | 260/37 |
| 3,304,282 | 2/1967 | Cadus et al. | 260/37 |
| 3,409,711 | 11/1968 | Pashak et al. | 264/349 |
| 3,412,062 | 11/1968 | Johnson et al. | 260/37 |
| 3,453,356 | 7/1969 | Kent, Jr. et al. | 264/176 R |
| 3,525,124 | 8/1970 | Ocker | 425/204 |
| 3,577,494 | 5/1971 | Chisholm et al. | 264/349 |
| 3,661,837 | 5/1972 | Cadus et al. | 260/37 |
| 3,732,345 | 5/1973 | Amos et al. | 264/349 |
| 3,843,757 | 10/1974 | Ehrenfreund et al. | 425/204 |
| 3,850,873 | 11/1974 | Wurmb et al. | 260/37 |
| 3,919,164 | 11/1975 | Hattori et al. | 264/176 R |
| 4,042,747 | 8/1977 | Breton et al. | 264/127 |
| 4,058,578 | 11/1977 | Kuhls et al. | 264/176 R |
| 4,163,742 | 8/1979 | Mansure | 260/42.17 |
| 4,229,340 | 10/1980 | Druin et al. | 260/40 |

FOREIGN PATENT DOCUMENTS

| | | |
|---|---|---|
| 1454802 | 6/1971 | Fed. Rep. of Germany . |
| 2107927 | 7/1972 | Fed. Rep. of Germany ...... 425/204 |
| 2321325 | 11/1974 | Fed. Rep. of Germany ...... 425/204 |
| 988563 | 4/1965 | United Kingdom . |
| 1291997 | 10/1972 | United Kingdom . |
| 1324424 | 7/1973 | United Kingdom . |
| 1439327 | 6/1976 | United Kingdom . |
| 1485500 | 9/1977 | United Kingdom . |
| 1592205 | 7/1981 | United Kingdom . |

OTHER PUBLICATIONS

Japanese extract J5 1011-834, 7/71.
Japanese extract J5 2011-277, 7/75.

*Primary Examiner*—Jeffery R. Thurlow

[57] ABSTRACT

An extruder process for blending carbon fiber and tetrafluoroethylene copolymer resins, and laminates from the product of the process.

2 Claims, No Drawings

EXTRUDER PROCESS FOR PREPARATION OF CARBON FIBER REINFORCED FLUOROPOLYMER COMPOSITIONS

BACKGROUND

Carbon fiber reinforced melt-fabricable tetrafluoroethylene copolymer resins such as those disclosed in U.S. Pat. No. 4,163,742 issued Aug. 7, 1979 on the application of Mansure, molded into such items as gaskets, valve seats, valve balls and various other compressor and pump parts, have displayed excellent resistance to deformation at high temperatures. These reinforced resins have heretofore been prepared, as taught by Mansure, by blending the resin and fibers in a mixture of water and a selected water-miscible organic solvent. This process, however, does not lend itself to acceptable continuous commercial production of the blended resin. It is, therefore, desirable to devise a more economical process for such production.

SUMMARY OF THE INVENTION

The subject invention is an extruder process for preparing a blend of carbon fiber and tetrafluoroethylene copolymer.

More specifically, in one embodiment of the subject invention, the process comprises providing a corotating, intermeshing twin screw extruder with a screw speed of 50 to 120 RPM, and a barrel temperature of 220° to 410° C., said extruder having a first zone wherein the ratio of screw length to screw pitch is 11 to 15, a second zone for metering the blend and a die slot such that the slot opening is 2 to 4 mm across; feeding the polymer and 20 to 35 weight percent based on polymer of continuous carbon fiber into the first zone, therein melting the polymer, chopping the fibers so that a substantial fraction is from 1.5 to 13 mm in length and blending the polymer and chopped fibers; and transferring the polymer/fiber blend through the second zone of the extruder and out of the extruder process through the die slot.

In another embodiment of the subject invention, the process comprises providing a corotating, intermeshing twin screw extruder with a screw speed of 50 to 120 RPM and a barrel temperature of 220° to 410° C., said extruder having a first plasticating zone, a second zone wherein the ratio of screw length to screw pitch is 4 to 6 and a die slot zone such that the slot opening is 2 to 4 mm across; feeding the polymer into the first plasticating zone and retaining it therein until substantially molten; transferring the molten polymer to the second zone and concurrently feeding 20 to 35 weight percent based on polymer of continuous carbon fiber into said second zone whereby the fibers are chopped so that a substantial fraction is from 1.5 to 13 mm in length and blended with the molten polymer; and transferring the polymer/fiber blend out of the extruder through the die slot.

DETAILED DESCRIPTION

As in U.S. Pat. No. 4,163,742, the tetrafluoroethylene copolymer resins employed herein, in powder or pellet form, are melt-fabricable ones, as opposed to non-melt-fabricable resins typified by the homopolymer, polytetrafluoroethylene. Generally, polymers of the non-melt-fabricable variety have melt viscosities of $1 \times 10^9$ poises or more at 380° C., whereas melt-fabricable tetrafluoroethylene copolymers have sufficient comonomer to lower the melt viscosity to $1 \times 10^4 - 1 \times 10^7$ poises at 380° C. to permit melt fabrication and still retain useful properties for fabricated articles.

Generally, the more comonomer present, the lower the melt viscosity. Thus, the melt-fabricable tetrafluoroethylene copolymers employed herein comprise copolymers of tetrafluoroethylene and, e.g., a different perfluorinated ethylenically unsaturated organic copolymerizable monomer present in an amount which allows the melt viscosity of the resultant copolymer to be below $1 \times 10^7$ poise at 380° C. One preferred class of ethylenically unsaturated monomers is the perfluoro(alkyl vinyl ethers) of 3-7 carbon atoms. Generally, the copolymer can contain 0.5-20% by weight of these comonomers. Another preferred class is the perfluoro (terminally unsaturated olefins) of 3-7 carbon atoms. Generally, the copolymer can contain up to about 10-25% by weight of these comonomers. Other useful copolymers include those employing chlorotrifluoroethylene, as well as copolymers of tetrafluoroethylene and ethylene. If less than the amount of comonomer above specified is present, the copolymer described above will not be melt-fabricable; on the other hand, if more than the amount specified is present, the copolymer will become elastomeric.

The carbon fiber to be blended with any one of the above detailed resins will preferably have tensile strengths of at least 200,000 psi and a diameter of 2-20 microns, the surface of which being treated by conventional means, or optionally untreated. After chopping in accordance with the process of the subject invention, a substantial fraction of the fibers will have a length of between about 1.5 and 13 mm. The reinforced resin will contain 20 to 35 weight percent carbon fiber, and more preferably, 30 to 35 weight percent.

The process of the subject invention blends the tetrafluoroethylene copolymer resin and carbon fiber in a twin-screw, co-rotating, intermeshing extruder such as that designed by Werner and Pfleiderer. For purposes of the subject invention, the barrel temperature should be such as will melt the tetrafluoroethylene copolymer resin, generally varying from about 220° C. at the hopper to 410° C. at the die.

A critical aspect of the subject invention is the need to feed continuous carbon fiber into the extruder so that the fiber is chopped to the proper length and homogeneously blended with the then molten tetrafluoroethylene copolymer resin. If pre-chopped fiber is fed into the extruder, the fiber pieces tend to agglomerate by entanglement and will not feed uniformly into the extruder, hence, blending is impaired. For purposes of the subject invention, continuous carbon fiber is that having lengths at least about 10 cm so that the fiber is able to be wrapped around the extruder screw, thereby drawing the fiber uniformly into the extruder process. However, preferably, the continuous fibers are drawn into the extruder from a spool thereof.

In one embodiment of the subject invention, the continuous carbon fiber is fed, along with the tetrafluoroethylene copolymer resin, into the extruder, at the hopper. In order to chop the fiber to the proper length, melt the resin and adequately blend the chopped fiber and resin, the first zone proximate the hopper need have a screw configuration such that the ratio of screw length to screw pitch is between about 11 and 15; a higher ratio will chop the fiber to less than the desired length and, therefore, compromise the reinforcing characteristics of the fiber, while a lower ratio will fail to homogeneously blend fiber and resin. The screw speed useful for purposes of this particular embodiment should be between about 50 and 120 RPM.

Following this first zone, this embodiment of the process of the subject invention utilizes a conventional metering zone for transferring the blend to the extruder die, generally requiring a ratio of screw length to screw pitch of between about 2 and 9.

As another critical aspect of the subject invention, the die slot opening need be between 2 and 4 mm; a smaller opening tends to clog, while a larger opening does not align the fibers of the extruded sheet substantially in the plane of extrusion. Such fiber alignment results in expected compressive forces exerted on such articles to be perpendicular to the fibers, thus maximizing the fibers' reinforcing tendencies.

In another embodiment of the subject invention, the continuous carbon fiber is fed into the extruder through a vent port located downstream from the hopper. The tetrafluoroethylene copolymer is fed into the hopper, plasticated in a first zone of the extruder under conditions well known in the art, then transferred to a second zone wherein the vent port exists. This second zone need have a ratio of screw length to screw pitch of from about 4 to 6 in order to adequately chop the continuous fiber to be fed thereinto, and homogeneously blend this chopped fiber and resin. Again, a higher ratio will chop the fiber to less than the desired length, while a lower ratio will fail to homogeneously blend the fiber and resin. The screw speed useful for purposes of this particular embodiment should be between about 50 and 120 RPM. After blending the chopped fiber and resin, the blend is conveyed out of the extruder through a die slot, the particulars of such being detailed above.

The blend produced by the process of the subject invention exits the die slot in the form of a thin sheet. To form articles of substantial thickness, a plurality of these sheets can be laminated together in pressure molds well known in the art and detailed in the examples below.

EXAMPLE 1

This example is to illustrate the embodiment of the subject invention wherein the continuous fiber is fed into the extruder, along with the resin, at the hopper.

A copolymer of tetrafluoroethylene perfluoro (propylvinyl)ether (about 3% alkyl ether and $5 \times 10^4$ poises at 372° C.) resin was fed at about 4 kg/hr into the hopper of a corotating twin screw, 28 mm Werner and Pfleiderer extruder with a screw speed of 112 RPM and a barrel temperature graduating from 240° C. at the hopper to 400° C. at the die. Concurrently, continuous graphite fiber (Hercules "Magnamite" AS with a diameter of 8 microns, a tensile strength of 2.8 GPa and a modulus of 0.22 TPa) was fed into the hopper at about 2 kg/hr, chopped and blended with the molten resin, and metered through the remainder of the extruder process. The screw configuration was as follows:

| extruder length (mm) | screw pitch | |
|---|---|---|
| 0 | ↑ | |
| 90 | ↑ | |
| 180 | 45 | (triple flight) |
| 270 | ↓ | |
| 360 | ↓ | |
| 450 | ↓ | |
| 540 | ↓ | |
| 630 | ↑ | |
| 720 | 30 | (single flight) |
| 780 | ↓ | | so that the ratio of screw length to screw pitch in the first zone, i.e., the first 540 mm, was 12, and the ratio in the second metering zone was 2.7. (In calculating screw length to screw pitch ratios, a triple flight screw was used as the standard, therefore, when the ratio is calculated for a configuration containing a single flight screw element, the ratio for that particular element need be divided by 3 before adding the ratio for that element to the ratios of the remaining triple flight elements). The blend was metered out of a 2.3 mm die slot opening in sheet form. Sheet disks were cut to 8.6 cm in diameter and a total of 170 g loaded into a laminating pressure mold (conventional cross-lamination being preferred). The mold was then placed in a press and heated under contact pressure to 345° C., held for 15 minutes under about 7 MPa pressure (4536 kg force), cooled to room temperature under pressure and removed from the mold. The percent deformation at 235° C. (ASTM D621, 24 hr deformation under 14 MPa pressure) was measured at 1.3.

EXAMPLE II

This example is to illustrate the embodiment of the subject invention wherein the continuous fiber is fed into the vent port of the extruder.

The resin used in Example I was fed into the hopper of the same extruder at about 3 kg/hr and melted in the first zone of the extruder. The screw speed was 110 RPM and the barrel temperature graduated from 225° C. at the hopper to 402° C. at the die. The molten polymer was passed into a second zone having a vent port therewith while continuous graphite fiber was fed at about 1.0 kg/hr into the extruder through this vent port. The screw configuration was as follows:

| extruder length (mm) | | screw pitch | |
|---|---|---|---|
| ↑ | 0 | | |
| ↑ | 30 | | |
| ↑ | 60 | 45 | (triple flight) |
| ↑ | 90 | | |
| ↑ | 120 | | |
| ↑ | 150 | | |
| ↑ | 180 | | |
| (first zone) | 210 | 30 | (triple flight) |
| | 240 | | |
| ↓ | | 24 | (triple flight) |
| ↓ | 270 | | left hand kneading block |
| ↓ | | | |
| ↓ | 300 | | |
| ↓ | | 24 | (reverse) |
| ↓ | 330 | | |
| ↓ | 360 | 45 | (triple flight) |
| ↓ | 390 | | |
| ↓ | 420 | | |
| ↓ | 450 | | |
| ↓ | | 30 | (triple flight) |
| ↓ | 480 | 24 | (reverse) |

-continued

| | extruder length (mm) | screw pitch | |
|---|---|---|---|
| ↓ | 510 | 45 | (triple flight) |
| ↑ | 540 | | (vent port) |
| ↑ | 570 | 30 | (single flight) |
| (second zone) | 600 | | |
| | 630 | | |
| ↑ | 660 | | |
| ↑ | 690 | 45 | (triple flight) |
| ↓ | 720 | | |
| ↓ | 750 | | |
| ↓ | 780 | 30 | (triple flight) | so that the first zone is a conventional plasticating zone and the second zone containing the vent port has a screw length to screw pitch ratio of 3.0. As the fiber entered the extruder, it was chopped and blended with the molten resin, the blend then metered out of the extruder process through the die slot as detailed above. Again, also detailed above, sheets exiting the die were laminated and percent deformation measured as 0.8 at 200° C. and 1.0 at 235° C.

DELAMINATION VALVE TEST

A laminate prepared in accordance with the procedure of Example I was cut in the shape of a conventional valve seat and subjected to 15,000 cycles in a Worcester ball valve in 170° C. (0.7 MPa) steam line. After cycling, the valve seat continued to hold 4.5 MPa hydrostatic pressure.

I claim:

1. A process for preparing a blend of a melt-extrudable tetrafluoroethylene copolymer and carbon fiber comprising:
   (i) providing a corotating, intermeshing twin screw extruder with a screw speed of 50 to 120 RPM, a barrel temperature of 220° to 410° C., a first zone wherein the ratio of screw length to screw pitch is about 11 to 15, a second zone for metering the blend and a die slot having an opening of 2 to 4 mm;
   (ii) feeding the polymer and 20 to 35 weight percent based on polymer of continuous carbon fiber into the first zone, therein melting the polymer, chopping the fibers so that a substantial fraction is from about 1.5 to 13 mm in length and blending the polymer and chopped fibers; and
   (iii) transferring the polymer/fiber blend through the second zone of the extruder and out of the extruder through the die slot.

2. A process for preparing a blend of a melt-extrudable tetrafluoroethylene copolymer and carbon fiber comprising:
   (i) providing a corotating, intermeshing twin screw extruder with a screw speed of 50 to 120 RPM, a barrel temperature of 220° to 410° C., a first plasticating zone, a second zone wherein the ratio of screw length to screw pitch is 4 to 6 and a die slot having an opening of 2 to 4 mm;
   (ii) feeding the polymer into the first plasticating zone and retaining it therein until substantially molten;
   (iii) transferring the molten polymer to the second zone and concurrently feeding 20 to 35 weight percent based on polymer of continuous carbon fiber into said second zone whereby the fibers are chopped so that a substantial fraction is from about 1.5 to 13 mm in length and blended with the molten polymer; and
   (iv) transferring the polymer/fiber blend out of the extruder through the die slot.

* * * * *